April 20, 1943.    R. M. DILWORTH    2,317,258
TRANSITION CONTROL SYSTEM
Filed Nov. 4, 1940    2 Sheets-Sheet 1

Inventor
Richard M. Dilworth
By Blackmore, Spencer & Flint
Attorneys

April 20, 1943.  R. M. DILWORTH  2,317,258
TRANSITION CONTROL SYSTEM
Filed Nov. 4, 1940  2 Sheets-Sheet 2

Inventor
Richard M. Dilworth
By Blackmore, Spencer & Flint
Attorneys

Patented Apr. 20, 1943

2,317,258

UNITED STATES PATENT OFFICE 2,317,258

TRANSITION CONTROL SYSTEM

Richard M. Dilworth, La Grange, Ill., assignor to General Motors Corporation, Detroit, Mich., a corporation of Delaware Application November 4, 1940, Serial No. 364,162

4 Claims. (Cl. 177—311)

The present invention relates generally to generating electric traction systems for vehicles and more particularly to a novel transition control system whereby transition of the traction motor connections may be accomplished in a highly efficient manner.

The principal object of the present invention is to provide simple manual control means to accomplish transition of the motor connections in combination with transition indicating means by which the operator is informed as to the proper time for operation of the transition control means to obtain different torque and speed characteristics from the motors and to prevent over and under loading of the power units and also to prevent excessive current surges from occurring during such transition thus reducing shock loads on the vehicle and vehicle power units.

The above and other objects, together with the means by which they are accomplished, will be better understood by referring to the following detailed description and accompanying drawings illustrating the control system as applied to a locomotive, for which it is particularly adapted. It will be evident that such a control system may be employed with equal advantages on other electrically driven vehicles.

Figure 1 of the drawings shows the complete power and control system in diagrammatic form.

Figure 1:
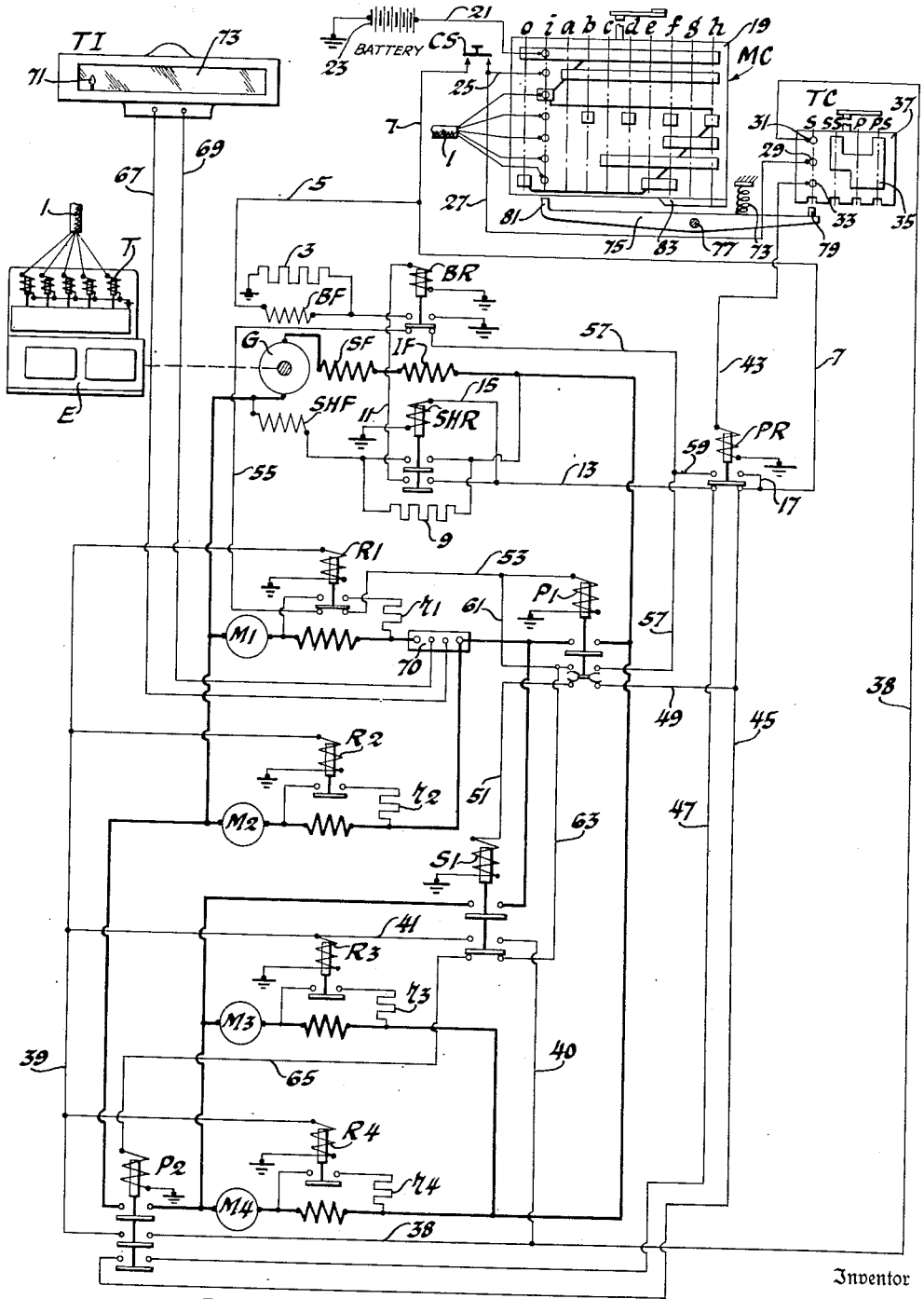
Figure 2:
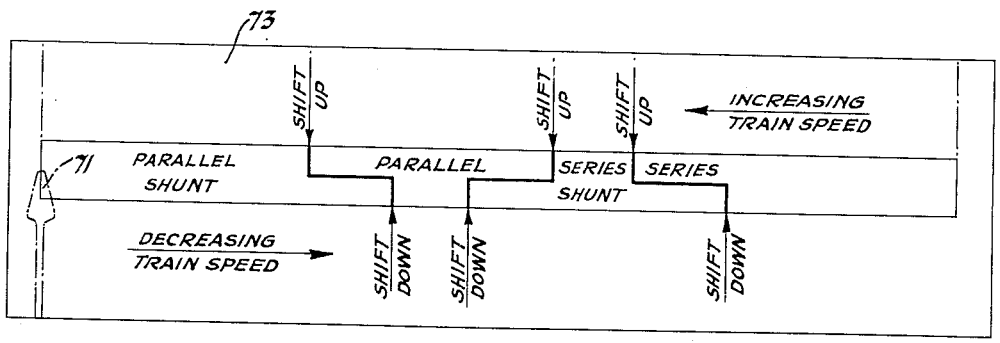
Figure 2 shows an enlarged view of the dial of the transition indicator shown in Figure 1.

Referring to Figure 1 of the drawings the locomotive power system includes a power source comprising any type of prime mover shown as a Diesel engine at E and a generator G driven thereby, and a plurality of traction motors of the series type shown at M1 to M4, each of which may be connected in any well known manner to drive individual axles or wheels of the locomotive.

Power connections and conductors shown by heavy lines, and contactors S1, P1 and P2 are provided whereby the motors may be connected in one relation with the generator to give low speed and high torque output characteristics, or connected in another relation to give high speed and reduced torque output characteristics. The low speed high torque connection usually is either a series or a series-parallel connection which is established by the contactor S1, which will be referred to as the series contactor. The high speed reduced torque motor connection usually is a parallel connection which is established by contactors P1 and P2, which will be referred to as parallel contactors.

In order to provide increased speed and torque characteristics from the motors for either of the above mentioned connections, motor excitation regulating means is provided. This means includes motor series field shunting resistors shown at r1 to r4, and relays R1 to R4. Each resistor is shown connected to the upper fixed contacts of each of the relays and to the series field winding of one motor so that when these contacts are bridged by a relay armature contact the resistor will be connected in shunt relation with the motor field winding to reduce the excitation current therein, which causes a reduction in the back voltage generated by the motor and allows more current to be supplied thereto from the generator, which causes an increase in the torque and therefore an increase in the speed of the motor.

Each of the above mentioned contactors and relays is shown provided with an electromagnetic winding which, when energized, attracts and moves an armature provided with suitable contacts upward from the position shown into or out of bridging relation with pairs of fixed contacts adjacent thereto. The upper pair of fixed contacts on the contactors S1, P1 and P2, to which the power conductors are connected, are power contacts, and the lower smaller fixed contacts are control and interlocking contacts. These interlocking contacts are shown interconnected by means of interlocking and control conductors, shown by lighter lines, with similar fixed contacts, and the electromagnetic windings of the relays R1 to R4 and relays SHR and BR, and with the fixed contacts of a control relay PR. The energization of the winding of the control relay is controlled by a transition controller TC and this relay serves to control the proper sequence of energization of the windings of the contactors and relays through the control and interlocking conductors in a manner to be described in detail later. As shown, one terminal of each of the windings of the relays and contactors is grounded. The relay R1 is shown provided with an additional pair of fixed contacts, which will be referred to later, and the contactor P2 is provided with any well known means whereby both pairs of its fixed interlocking contacts are bridged when the armature is moved between the normal or lower position and the extreme upward position. The means by which this overlapping contact action between both pairs of interlocking contacts is accomplished is shown schematically and includes flexible contact fingers, attached to the lower end of the armature of the contactor P2, which bridge both pairs of contacts when the armature moves between the normal or lower position as shown and the extreme upward position. This means prevents opening of the power circuit upon transition of the motor connections with respect to the generator, as will be subsequently described.

With the power conductors connected as shown, pairs of motors are permanently connected in parallel, and upon upward movement of the armature of contactor S1 into bridging relation with the power contacts each pair of motors will be connected in series relation with the generator to provide low speed and high torque characteristics from the motors, or upon upward movement of the armatures of contactors P1 and P2 into bridging relation with their power contacts each pair of motors will be connected in a parallel relation with the generator to provide high speed and reduced torque characteristics from the motors. It will be obvious that the motors may be connected to the generator in different relations to obtain different variations in values in the motor speed and torque characteristics than those mentioned above. In referring to the two connections shown, the series relation will be referred to as the high-torque connection and the parallel relation will be referred to as the high speed connection.

Power output regulating means are provided to regulate the power output of the power source to regulate the current supplied to the motors. These regulating means comprise a fuel regulating means shown generally at T and a generator excitation regulating means, to be described, controlled jointly by a control switch CS, a master controller MC, the transition controller TC and control relay PR.

The engine fuel regulating means T may be operated by any well known means which may be controlled by the master controller MC. The operating means, illustrated schematically, is a plurality of electromagnetic windings for moving plungers which may be operatively connected to the engine fuel regulating device or to the engine governor so that the speed, torque, and therefore the power output of the engine may be varied. As shown, one terminal of each of these windings is grounded, and individual control conductors are shown connected to the other terminals and extending into a control conduit 1 which extends to the master controller which, as will be explained, serves to control energization of these windings separately or in combination in order to control the fuel supplied to the engine and therefore the speed, torque, and power output thereof.

The generator G is provided with a separately excited field winding BF, a shunt field winding SHF, a series field winding SF and an interpole field winding IF, which co-operate to provide inherent output regulation of the generator.

The generator excitation regulating means mentioned above includes rheostats shown at 3 and 9 and the relays BR, SHR and PR. One terminal of the rheostat 3 is grounded and the other terminal is connected to the upper left contact of the relay BR and also to one terminal of the separately excited field winding BF, the other terminal of which is connected by a conductor 5 to a battery or control conductor 7 shown connected to one contact of the manually operable control switch CS which, as will be subsequently described, when closed, serves to connect conductor 7 to a battery shown at 23. The upper right contact of the relay BR is shown grounded so that when the upper pair of contacts of the relay BR are bridged by an armature contact the rheostat 3 is shorted out to increase the excitation current supplied by the battery to the separately excited field winding and thereby to increase the generator power output. The rheostat 9 is shown connected in series with the shunt field winding SHF, and a lead from each terminal of this rheostat is connected to each of the upper fixed contacts of relay SHR so that when these contacts are bridged by an armature contact the rheostat 9 will be shorted out of the shunt field winding to increase the excitation current flowing therethrough and likewise will cause an increase in the generator output. The ungrounded terminal of the winding of relay BR is connected by a conductor 11 to the left lower contact of relay SHR, the right lower contact being connected by a conductor 13 to the left lower contact of the control relay PR, and a jumper conductor 15 is shown connecting the ungrounded terminal of the winding of relay SHR to the conductor 13. The right upper and lower contacts of the control relay PR are interconnected by a conductor 17 which is connected to the battery or control conductor 7. With the control relay armature in the normal position as shown, the winding of relay SHR, as will be subsequently explained, will be energized through conductors 7 and 13, causing upward movement of its armature to connect conductor 13 to conductor 11, thus causing energization of the winding of relay BR and upward movement of its armature.

The master controller is provided with a plurality of fixed contacts and a plurality of electrically interconnected contacts attached to a controller drum 19 which is manually movable to a plurality of positions, shown by dotted lines lettered o, i, and a to h, to cause certain of the fixed contacts to be bridged by certain of the drum contacts for each of the controller positions. As shown, the upper fixed controller contact is connected by a conductor 21 to one terminal of the battery 23, the other terminal of which is shown connected to ground. The second fixed controller contact from the top is connected by a conductor 25 to the other terminal of the previously mentioned control switch CS. With the controller contacts arranged as shown, the two upper fixed controller contacts are bridged by drum contacts when the controller drum is moved to any position between a and h, and therefore, when the control switch is closed, the battery or control conductor 7 and the conductors 5 and 17 connected thereto will be connected to the battery 23. A control conductor 27 is connected between the conductor 25 and the transition controller and will accordingly be connected to the battery only when the master controller is moved to any position between a and h'. The remaining fixed contacts of the master controller are connected to individual electromagnetic windings of the fuel regulating device T by the conductors previously mentioned carried in the control conduit 1, and one of these windings is connected to the battery when the controller drum 19 is in the position i, as shown, and is therefore energized moving one of the plungers so that the amount of fuel supplied to the engine will cause it to operate at idling speed. When the drum 19 is moved to the right from position i corresponding to the engine idling speed position to position o or off position, another electromagnetic winding is connected to the battery to move another plunger to cut off the fuel to the engine to stop operation thereof. Movement of the controller drum 19 to the left from the idling position to positions a to h successively, causes certain combinations of the electromagnetic windings of the engine fuel regulator to be energized through certain of the conductors connected thereto and carried in the conduit 1 to cause increasing amounts of fuel to be supplied to the engine to increase the speed and torque of the engine and therefore its power output to the maximum value.

The transition controller TC also has a plurality of fixed contacts shown at 29, 31, and 33 and a contact 35 fixed to a controller drum 37 which is manually movable to four positions shown by dotted lines, S, SS, P, and PS to cause certain of these fixed contacts to be bridged by the drum contact 35. The control conductor 27, previously mentioned, by which the transition controller is connected to the battery upon movement of the master controller drum 19 to any position between positions a and h, is connected to the fixed contact 29 of the transition controller. The fixed controller contact 31 is connected by a conductor 38 to the upper right interlocking contact of contactor P2, the upper left interlocking contact of which is connected to each of the windings of the relays R1 to R4 by a conductor 39. A jumper conductor 40 serves to interconnect conductor 38 with the upper right interlocking contact of the contactor S1, the upper left interlocking contact of which is connected by a jumper conductor 41 to the conductor 39. The lower fixed contact 33 of the transition controller is connected to the winding of the control relay PR by a conductor 43.

As will be evident from Figure 1 of the drawings, the transition controller drum contact 35 is so shaped that when the drum 37 is in the position S, which is the high torque or series position, none of the fixed contacts 29, 31 and 33 are bridged by the drum contact 35, but when the drum is moved to the left to either the SS or PS positions, which are, respectively, the series-shunt and parallel-shunt positions of the controller, the drum contact 35 will bridge the fixed contacts 29 and 31 and the windings of the relays R1 to R4 will accordingly be connected to the battery by conductors 27, 38, 40 and 41 when the series contactor is moved upward to establish the high torque motor connection, or by conductor 39 when the contactor armature P2 is moved upward to establish the high speed motor connection. Energization of the windings of relays R1 to R4 causes upward movement of their armatures to connect the field shunting resistors r1 to r4 in shunt with the respective motor field windings to reduce the excitation of the motors, which reduces the back voltage and allows more current to be supplied to the motors from the generator causing an increase in the motor torque and therefore an increase in speed. As the motor field windings may be so shunted, either when the motors are connected in series relation with the generator or when connected in a parallel relation, an increase in the motor torque and speed will be obtained from the motors for either the low speed motor connection or the high speed motor connection. When the controller drum 37 is moved from the series-shunt position SS to the parallel position P the fixed contacts 29 and 31 will be opened and the fixed contacts 29 and 33 will be bridged, which causes de-energization of the relays R1 to R4 and energization of the winding of the control relay PR as it is then connected to the battery 23 by the conductor 43. Energization of the winding causes upward movement of the armature which causes transition of the motor connections with respect to the generator from the high torque or series connection with the motor fields shunted to the high speed or parallel position by causing energization of the windings of contactors P1 and P2 and de-energization of the winding of contactor S1 and causing the windings of relays SHR and BR to be first energized and then de-energized to cause the output of the power source to be momentarily reduced for reasons to be described later in explaining the operation. Movement of the transition controller drum 37 in the reverse order, that is, from the parallel position P to the series-shunt position SS, causes the fixed controller contacts 29 and 33 to be opened, which causes de-energization of the winding of the control relay PR and causes its armature to drop to the normal position shown. The dropping of the armature of the control relay causes transition from the high speed motor connection to the high torque or series connection with the motor fields shunted by causing de-energization of the windings of contactors P1 and P2 and energization of the contactor S1 and relays R1 to R4, and prevents de-energization of the windings of relays SHR and BR and therefore any change in the output of the power source.

The interlocking and control conductors interconnecting the control relay PR with the contactors and relays are connected and disconnected by movement of the armature of the control relay to cause the proper sequence of energization and operation of the contactors and relays in order to cause transition of the connections in the manner described above. These connections will now be described in detail:

The two right contacts of the control relay which are interconnected by the conductor 17, which is connected to the battery or control conductor 7, are also connected by a conductor 45 to the left lower interlocking contact of contactor P2, the right lower interlocking contact of which is connected to the left lower contact of the control relay PR by a conductor 47. A jumper conductor 49 is connected between the conductor 45 and the right lower interlocking contact of the contactor P1, the left lower contact of which is connected by a conductor 51 to the winding of the series contactor S1. Energization of the winding of contactor S1 can only take place when the armature of contactor P1 is in the normal position shown with the lower interlocking contacts bridged. The winding of the contactor P1 is connected by a conductor 53 to one lower contact of the relay R1, the other contact of which is connected by a conductor 55 to one lower contact of relay BF, the other lower contact of which is connected to the upper right interlocking contact of contactor P1 by a conductor 57, to which the upper left contact of the control relay is also connected by means of a jumper conductor 59. The upper left contact of the contactor P1 is connected to conductor 53 by a jumper conductor 61 and to the right lower interlocking contact of contactor S1 by a jumper conductor 63. The left lower interlocking contact of contactor S1 is connected to the winding of contactor P2 by a conductor 65.

In order to vary the speed and torque or tractive effort of the locomotive to suit different operating requirements it is necessary that the locomotive engineer accomplish transition of the motor connections at certain definite values of load and speed for both increasing and decreasing values of locomotive and train speed. Transition of the connections at other than these certain values of load and speed causes excessive surges in generator and motor current and electrical and mechanical stresses on the power units and locomotive. In order to prevent overloading and underloading and stresses on the power units a transition indicator shown at TI is provided to indicate the proper load and speed at which the transition controller TC should be operated to accomplish transition of the motor connections. Interlocking means are also provided to prevent operation of the transition controller when the engine is operated at the higher values of speed, torque, and therefore power output, which prevents shocks on the power units and locomotive.

The transition indicator TI is shown as an electric meter having leads 67 and 69 connected across the terminals of a meter shunt 70 which is connected in series with the motor M1. The movable element of the meter includes an indicating needle 71 which moves in front of a dial 73, shown best in Figure 3. The dial is divided into four zones marked Parallel-shunt, Parallel, Series-shunt and Series, corresponding to the control positions of the transition controller TC. The motor current in a series type traction motor is inversely proportional to its speed, and as the transition indicator meter TI is connected to indicate the IR drop across the shunt 70 and therefore the current through motor M1, the needle 71 will move to the right in the direction indicated by the arrow at the lower left of the dial 73 marked Decreasing train speed upon an increase in motor current. For decreasing values in motor current the needle will move back to the left in the direction of the arrow at the upper right of the dial marked Increasing train speed. The downwardly pointing arrows marked Shift up at the top of the dial between the various zones indicate the proper generator and load current and motor and train speed at which the change between the motor connections indicated in the zones adjacent the arrow point should be made for increasing values of train speed. The upwardly pointing arrows marked Shift down indicate the proper value of load and speed at which the motor connections should be changed for decreasing values of train speed. With the transition indicator TI connected to indicate the current flow in motor M1 only, the needle 71 will accordingly indicate one half generator current with each pair of motors connected in series with the generator to obtain high torque characteristics and one fourth generator current with the motors connected in parallel to obtain high speed characteristics.

The interlocking means between the master controller MC and transition controller TC is shown schematically as mechanical means. However, electrical means may be used if desired. The means shown includes a lever 75, rotatable about a fixed pivot 77 and having a detent lug 79 on one end capable of moving upward and entering slots shown in the lower portion of the drum 37 of the transition controller to hold the drum in any one of the positions indicated when the opposite bent end 81 of the lever is contacted and moved downward by a cam 83 on the lower portion of the drum 19 of the master controller upon movement of this drum to positions f, g and h, corresponding to the higher values of power output of the engine.

With the various control means in the position shown the operation of the control system is as follows:

Closure of the control switch CS connects conductors 5, 7 and 45 to conductors 25 and 27, and movement of the drum 19 of the master controller in steps from position i to position h causes energization of the electromagnetic actuating windings of the engine fuel regulating means T to increase the engine power output in the manner previously described, and also causes conductor 25 to be connected to the battery conductor 21 by the bridging of the two upper fixed contacts of the master controller by the two upper electrically interconnected drum contacts. The windings of the series contactor S1 and relay SHR are accordingly energized, the winding of contactor S1 being connected to conductor 45 by conductors 49 and 51, which are connected by the bridged lower contacts of contactor P1, and the winding of relay SHR being connected to conductors 7 and 45 by conductors 15, 13 and 17, which are connected by the bridged lower contacts of the control relay PR. The resulting upward movement of the armature of contactor S1 causes each pair of motors to be connected in series with the generator to establish the high torque motor connection by the bridging of power contacts; the upper pair of interlocking contacts of the contactor S1 are also bridged, which connects conductors 40 and 41 together, and the lower pair of interlocking contacts are opened. Upward movement of the armature of relay SHR causes both pairs of contacts to be bridged to shunt the rheostat 9 out of circuit including the shunt field winding SHF and to connect conductors 11 and 13 together to cause energization of the winding of relay BR, and its armature is therefore moved upward out of bridging relation with its lower pair of contacts and into bridging relation with the upper pair of contacts to shunt the rheostat 3 out of the circuit which includes the separately excited field winding. Battery current is then supplied to the separately excited field through conductors 7 and 5. As both rheostats are now shorted out, the excitation current through both of these generator field windings is increased to increase the power output of the generator to its maximum value to supply the motors with high values of current for starting the locomotive and train pulled thereby. The generator current will reach a maximum value as shown by the solid line curve in Figure 3 in the portion of the curve marked Series. The needle of the transition indicator will move to the zone marked Series on the dial 73 corresponding to this high value of generator current and high torque connection of the motors with the generator.

As the motor and locomotive speed increases the current will fall, as shown by the curve, and the needle 71 will move to the left, as indicated by the arrow in the upper right corner of the dial 73 marked Increasing train speed, on account of the rise in back voltage generated by the traction motors. When the current falls to the minimum value, as shown in the series portion of the curve, the needle 71 of the indicator will be adjacent the arrow pointing downward marked Shift up, which is located between the Series and the Series-shunt zone on the dial, indicating that the load current and motor and train speed are at the proper value to reduce the excitation of the motor fields by movement of the transition controller from the series position S to the series-shunt position SS to obtain higher speed motor characteristics.

In order to move the transition controller drum 37 from the S to the SS position, the master controller drum 19 must be moved back to position e, thus reducing the engine output and moving the mechanical interlocking means described above to its normal position, as shown, to allow this movement of the drum 37 of the transition controller. Movement of the transition controller drum to the position SS causes the fixed contacts 29 and 31 to be bridged by the drum contact 35, which connects the windings of all of the relays R1 to R4 to the battery through conductors 27, 38, 40 and 41. The conductors 40 and 41 now being connected by the bridged upper interlocking contacts of contactor S thus establish the series-shunt motor connection, that is, with both pairs of motors in series and with the shunting resistors r1 to r4 now connected in shunt across the motor series field windings by the upward movement of the armatures of relays R1 to R4 into bridging relation with the upper contacts of these relays. With the motors so connected the generator current will rise to a value slightly below that of the peak value shown in that portion of the curve in the region marked Series-shunt and will rise to this peak value when the master controller drum 19 is moved to the maximum engine output position h. The needle 71 of the indicator will accordingly move slightly to the right of the series-shunt zone on the dial, due to this rise in current, and then move back into this zone when the current falls, as shown by the curve, upon increasing locomotive speed. This increase in generator current causes the torque of the motors to increase and accordingly the speed will increase. When the current again falls, due to the increase in speed and therefore in back voltage, to the minimum current value shown in the series-shunt portion of the curve, the indicator needle 71 will move adjacent the downwardly pointing arrow marked Shift up located between the series-shunt and parallel zones on the dial to indicate that transition of the motor connections from the series-shunt to the parallel connection should be made. The master controller drum 19 must again be moved back to position e, which reduces the output of the engine and allows movement of the transition controller drum from the SS to the P position.

It is well known that upon changing from the high torque motor connection in which each pair of motors is in series with the generator to the high speed connection with the motors in parallel with the generator, the resistance of the generator external load will be reduced by half. The back voltage generated by the motors and impressed on the generator will also be reduced by half when the connections are so changed. Reducing both the resistance of the generator load circuit and the back voltage applied on the generator would cause a sudden rise in current in the power circuit, which would impose high electrical and mechanical shock stresses on the engine, generator, motors, locomotive, and train. To prevent this current surge, the transition indicator TI shows the proper load and speed at which to accomplish the transition. The master controller movement to position e reduces the engine output and allows movement of the transition controller to the parallel position, which causes the generator output also to be reduced as will now be explained, thus reducing the output of the power source and therefore the current supplied to the motors. Movement of the transition controller drum 37 from the series-shunt position SS to the parallel position P moves the drum contact 35 out of bridging relation with the fixed controller contacts 29 and 31 and into bridging relation with the fixed contacts 29 and 33. When contacts 29 and 31 are opened the windings of all the relays R1 to R4 are de-energized and the armatures of these relays fall to the position shown, opening the shunt connections of the shunting resistors r1 to r4 to the respective motor field windings to increase the excitation current therein and increase the back voltage of the motors. Bridging of the contacts 29 and 33 of the transition controller causes energization of the winding of the control relay PR through conductor 43, which causes its armature to move upward out of bridging relation with the lower contacts and into bridging relation with the upper contacts. Opening of the lower contacts disconnects conductor 13 from conductor 7 to cause de-energization of the windings of relays SHR and BR and downward movement of their armatures to the position shown, which inserts rheostats 3 and 9 in the separately excited generator field winding BF and shunt field winding SHF, respectively, to decrease the excitation current therein and therefore decrease the generator output. Closure of the upper contacts of the control relay PR causes energization of the winding of contactor P1 through the following conductors: 7, 17, 59, 57, 55, and 53. The armatures of relays BR and R1 are now in the position shown. The armature of contactor P1 will move up, and due to the overlapping contact action between the upper and lower pairs of fixed interlocking contacts by the armature contact, as has been explained above, both these pairs of interlocking contacts will be bridged for a substantial range of upward movement of the armature due to the spring contact fingers thereon, which prevents de-energization of the winding of contactor S1 to prevent opening of the power circuit between the motors until the armature of the contactor P1 is moved to its extreme upward position, at which its power contacts are closed and the lower pair of interlocking contacts are then opened to cause de-energization of the winding of contactor S and downward movement of its armature to the position shown. With the lower interlocking contacts of contactor S1 closed, the winding of the contactor P2 will be energized through conductors 7, 17, 59, 57, 63, and 65, and its power contacts will be bridged by the upward movement of its armature to complete high speed or parallel motor connection and cause both pairs of the fixed contacts to also be bridged. The bridging of the lower pair of interlocking contacts will cause energization of the windings of relays SHR and BR through conductors 7, 45, 47, 13, and 11 to again increase the output of the generator. The resulting rise in generator current will be slightly below that of the peak value shown in the parallel portion of the curve (see Figure 3), but will reach this peak value if the engine output is increased by movement of the master controller drum 19 to position h. The needle 71 of the transition indicator TI will accordingly move to the right into the series-shunt zone on the dial corresponding to this increase in generator current, but will then fall back into the parallel zone upon the increase in speed of the motors and locomotive, and when it is adjacent the downwardly pointing arrow located between the parallel and parallel-shunt zones on the indicator dial 73. With the needle 71 in this position the generator load current and the motor speed will be at a value suitable to cause reduction of the motor excitation to obtain maximum locomotive speed. The value of current at this time will be the minimum value shown in the parallel region on the curve.

When the transition controller TC is now moved from the parallel position P to the parallel-shunt position PS the controller fixed contact 31, as well as the fixed contacts 29 and 31, will be bridged by the drum contact 35 and the windings of relays R1 to R4 will be energized through conductors 38 and 39, and the motor shunting resistors r1 to r4 will accordingly be reinserted to reduce the motor excitation and increase the torque, and therefore the speed, of the motors and locomotive to the maximum value. The opening of the lower contacts of relay R1 does not cause de-energization of the winding of contactor P1, as upon upward movement of the armature of contactor P1 conductors 61 and 57 are connected and serve as a holding circuit. The needle 71 of the transition indicator will move to the right of corresponding to the increase in current, as shown on the curve (see Figure 3), and then move back to a position adjacent the parallel zone on the dial 73 corresponding to the maximum speed and minimum value of current in the parallel portion of the curve.

The above changes in the motor connections for increasing values in train speed were made when the transition indicator needle 71 was adjacent the downwardly pointing arrows marked Shift up corresponding to the minimum value of current for increasing values of speeds at 18, 31, and 50 miles per hour, respectively. In changing these connections in reverse order, namely, at speeds of 50, 31, and 18 miles per hour, the transition indicator needle will be adjacent the upwardly pointing arrows marked Shift down. These arrows are placed on the dial 73 to the right of the downwardly pointing arrows because the motor connections are changed at values of current slightly below the maximum peak values indicated at these speeds, since it is necessary, as has been pointed out, to reduce the engine output to cause movement of the transition controller drum. For decreasing values of train speed the motor back voltage falls, and when changing from the high speed or parallel connection to the high torque connection with each pair of motors connected in series, the back voltage impressed on the generator by the motors and resistance of the generator external load circuit is doubled, and therefore the generator current is reduced. It is therefore unnecessary to reduce the generator output as was done when changing from series-shunt to parallel connection. Accordingly, de-energization of the windings of relays SHR and BR is prevented, to prevent insertion of the rheostats 3 and 9 in the generator field circuits, thus preventing a reduction in generator excitation and therefore a reduction in the output upon transition of the motor connections from the parallel to the series-shunt connection, as will be described.

The change from the parallel-shunt to the parallel motor connection is made when the indicator needle 71 is adjacent the upwardly pointing arrow located between the parallel-shunt and the parallel zone on the indicator dial 73. Movement of the transition controller drum 37 from the PS to the P position opens the contacts 29 and 31 to open the circuit connection to the windings of relays R1 to R4 comprising conductors 27, 28 and 39. The armatures of relays R1 to R4 accordingly fall to the position shown, and the energization current in the motor series field windings is increased as the shunting resistor circuits are opened.

Transition from the high speed or parallel connection to the lower speed and higher torque or series-shunt motor connection is made by moving the transition control drum from position P to position SS when the indicator needle 71 is adjacent the upwardly pointing arrow between the parallel and series-shunt zones on the dial 73. The following events take place simultaneously when the drum 37 is moved between the P and SS positions: The conductor 43 is disconnected from contact 29 on the controller TC; the winding of the control relay PR is accordingly de-energized and its armature drops to the position shown, and the conductors 7 and 13 are again connected to maintain energization of the windings of the SHR and BR relays, these windings being previously energized through conductors 7, 45, 47, 13, and 11. The connection comprising conductors 7, 17, 59, 57, 55, and 53 and the holding circuit connection comprising conductors 7, 17, 59, 57, and 61 to the winding of the contactor P1 is opened, and the circuit comprising conductors 61, 63, and 65 to the winding of the contactor P2 is likewise opened, and the armatures of the contactors P1 and P2 fall to the position shown, opening the parallel motor connection. The winding of the contactor S1 is energized through conductors 7, 45, 49, and 51 to complete the high torque connection by the dropping of the armature of the contactor P1, and the motors are connected in the series-shunt arrangement by movement of the transition controller drum contact 35 into bridging relation with the fixed contacts 29 and 31, completing a circuit to the windings of the relays R1 to R4 through conductors 38, 40, 41 and 39, the conductors 40 and 41 now being connected by the bridged upper interlocking contacts of contactor S which causes the shunting resistors r1 to r4 to be connected in shunt with the motor field windings.

The change from the series-shunt motor connection to the series or high torque connection is made by moving the transition controller drum 37 from the SS to the S position when the needle of the transition indicator is adjacent the upwardly pointing arrow located between the series-shunt and series zones on the dial 73, which opens contacts 29 and 31 on the controller TC, thus opening the energization circuit comprising conductors 27, 38, 40, 41 and 39 and allowing the armatures of all the relays R1 to R4 to drop to the position shown, and the energization current in the motor field windings is accordingly increased as the shunting resistor circuits are then opened. Each pair of motors are then connected in series relation with the generator, which is the high torque connection.

Figure 3:
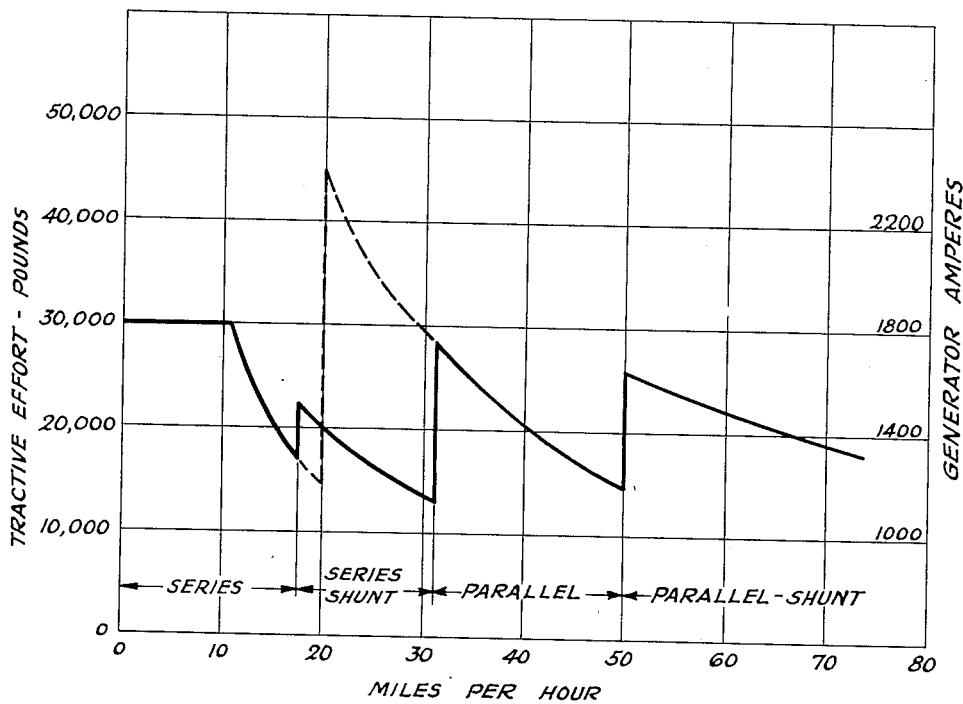
Figure 3 shows generator current and tractive effort curves plotted against speed, indicating the advantages obtained by the control system as used on a locomotive.

It will be evident by referring to Figure 3 that by providing a series-shunt motor connection the rise in generator current resulting from transition from the series-shunt to the parallel motor connection as shown by the solid line curve, at the proper load and speed as indicated by the transition indicator, is substantially lower than the maximum value of generator current with the motors connected in series-parallel when the locomotive is started from rest. The slight increase in generator current upon transition of the connections is due to the decrease in motor excitation current and the decrease in the power output of the engine and generator. If no series-shunt connection is provided and the connections are changed directly from the series-parallel to the parallel connection making the same reduction in engine and generator output at a proper value of speed and load, in order to obtain the least rise in current it is necessary to accomplish the transition of these connections at 18 miles per hour, and the generator current, as shown by the dotted line curve (see Figure 3), will increase to a value higher than the maximum starting current with the motors connected in series. If no transition indicator is provided and the locomotive engineer causes the motor connections to be changed at other than the proper value of load and speed, current surges of higher values than are shown by the dotted curve of Figure 3 occur due to his inability to judge the proper load and speed for accomplishing transition of the motor connections. These surges in current impose excessive electrical and mechanical stock stresses on the power units, locomotive, and cars pulled thereby, and are caused by operation of the power units in an underloaded or overloaded condition prior to transition. It will be evident, therefore, that the present control system and transition indicating means provides a decided advantage over conventional control systems.

It will also be evident to one familiar with the art that by providing certain obvious modifications in my control system, such as providing a straight series motor connection in addition to or in place of the system illustrated, in which groups of motors are connected in series with the generator, and modifying the transition indicator dial and transition interlocking and control arrangement to suit the modified motor connection arrangement, similar advantages may be obtained such as those described in the system illustrated.

I claim:

1. In a vehicle drive and control system comprising a plurality of electric driving motors, an electric generator for supplying power to the motors, a prime mover driving said generator, electrical connecting means between the generator and motors, said means including electrical indicating means, means for reducing the excitation of said motors, and switching means for connecting the motors in series-parallel and parallel circuit relations with the generator and for connecting the indicating means in each circuit relation, and a manually movable controller for controlling said motor excitation reducing means and said switching means, said controller being movable between the following control positions: (1) series-parallel, (2) series-parallel reduced motor excitation, (3) parallel and (4) parallel reduced motor excitation, whereby the motors may be respectively connected to the generator in circuit relations corresponding to the controller positions and said load current indicator rendered operative to indicate electrical variations for each circuit relation, said indicator having a dial on which the controller positions are marked and an element movable with respect to the dial in response to electrical variations for indicating the proper controller position for preselected ranges in electrical variations.

2. In a vehicle drive and control system comprising a plurality of electric driving motors, an electric generator for supplying power to the motors, a prime mover driving said generator, means for regulating the speed and power output of the prime mover at preselected values, electrical connecting means between the generator and motors, said connecting means including a load current indicator, means for reducing the excitation of the motors and switching means for connecting the motors in series-parallel and parallel circuit relations with the generator, a manually operable controller for controlling the speed and output regulating means for the prime mover, a second manually operable controller for controlling said motor excitation reducing means and said switching means, said controller being movable between the following control positions: (1) series-parallel, (2) series-parallel reduced motor excitation, (3) parallel, and (4) parallel reduced motor excitation, whereby the motors may be respectively connected to the generator in circuit relations corresponding to the control positions and the said load current indicator is rendered operative to indicate current variations for each circuit relation, said indicator having a dial on which the controller positions are marked and an element movable with respect to the dial in response to current variations for indicating the proper controller position for preselected values of current corresponding to preselected values of power output of the prime mover.

3. In a vehicle drive and control system comprising a plurality of electric driving motors, an electric generator for supplying power to the motors, a prime mover for driving the generator, means for regulating the prime mover output at preselected values, electrical connecting means between the generator and motors, said connecting means including load current indicating means, means for reducing the excitation of the motors, and switching means for connecting the motors in series-parallel and parallel circuit relations with the generator, a manual controller for controlling the prime mover output regulating means, a second manual controller for controlling the motor excitation reducing means and switching means, said second controller being movable between the following positions: (1) series-parallel, (2) series-parallel reduced motor excitation, (3) parallel, and (4) parallel reduced motor excitation, whereby motor and generator circuit relations corresponding to the controller positions are completed and said load current indicator is rendered operative to indicate current variations for each circuit relation, said indicator having a dial on which said controller positions and the sequence of change in these positions are shown, and an element moving in respect to the dial marking in response to current variations for indicating the proper operating sequence of the controller for preselected values of current corresponding to preselected values of output of the prime mover.

4. In a vehicle drive and control system comprising a plurality of electric driving motors, an electric generator for supplying power to the motors, a prime mover driving said generator, means for regulating the speed and power output of the prime mover at preselected values, a manually operable controller for controlling the regulating means, electrical connecting means between the generator and motors, said connecting means including a load current indicator, means for reducing the excitation of said motors and switching means for connecting the motors in series-parallel or parallel relation with the generator, a second manually operable controller for controlling said motor excitation reducing means and said switching means, said second controller being operable successively between the following control positions: (1) series-parallel, (2) series-parallel reduced motor excitation, (3) parallel, and (4) parallel reduced motor excitation, whereby the motors may be successively connected to the generator in circuit relations corresponding to the controller positions and said load indicator is rendered operative to indicate load current variations for each circuit relation, said indicator having a dial and an element movable with respect to the dial in response to current variations for indicating the proper controller position for preselected values of load current corresponding to certain preselected values of prime mover output, and locking means operatively connected to said first named controller and movable thereby into locking engagement with said second controller when said first controller is moved to cause operation of the prime mover to higher preselected values of power output.

RICHARD M. DILWORTH.